(12) United States Patent
Falter et al.

(10) Patent No.: US 7,596,436 B2
(45) Date of Patent: Sep. 29, 2009

(54) ELECTRONIC CONTROL DEVICE AND METHOD FOR CONTROLLING THE OPERATION OF MOTOR VEHICLE COMPONENTS

(75) Inventors: Johann Falter, Wenzenbach (DE); Alfons Fisch, Falkenstein (DE); Ralf Förster, Regensburg (DE); Marco Kick, Mintraching (DE); Thomas Maier, Neunburg v. Wald (DE); Norman Marenco, Hohenaspe (DE); Peter Skotzek, Madison, AL (US)

(73) Assignee: Siemens Aktiengesellschaft, Munich (DE)

( * ) Notice: Subject to any disclaimer, the term of this patent is extended or adjusted under 35 U.S.C. 154(b) by 75 days.

(21) Appl. No.: 11/587,983

(22) PCT Filed: Apr. 8, 2005

(86) PCT No.: PCT/EP2005/051567

§ 371 (c)(1),
(2), (4) Date: Oct. 27, 2006

(87) PCT Pub. No.: WO2005/106230

PCT Pub. Date: Nov. 10, 2005

(65) Prior Publication Data

US 2008/0004765 A1 Jan. 3, 2008

(30) Foreign Application Priority Data

Apr. 27, 2004 (DE) .................. 10 2004 020 539

(51) Int. Cl.
*G01M 17/00* (2006.01)

(52) U.S. Cl. ........................... 701/29; 340/662; 361/90

(58) Field of Classification Search ............... 701/29, 701/110, 115, 54; 324/133, 96, 115; 361/90, 361/100; 340/662
See application file for complete search history.

(56) References Cited

U.S. PATENT DOCUMENTS

| 4,559,497 | A | * | 12/1985 | Farrugia | ................. 324/133 |
| 4,998,520 | A | | 3/1991 | Wright | |
| 5,677,839 | A | | 10/1997 | Kondo | |
| 5,880,568 | A | | 3/1999 | Bederna et al. | |

(Continued)

FOREIGN PATENT DOCUMENTS

DE 44 38 714 A1 5/1996

(Continued)

OTHER PUBLICATIONS

Japanese Office Action dated Aug. 6, 2008.

*Primary Examiner*—Tuan C To
*Assistant Examiner*—Redhwan Mawari
(74) *Attorney, Agent, or Firm*—Laurence A. Greenberg; Werner H. Stemer; Ralph E. Locher

(57) ABSTRACT

The operating voltage is monitored in a microcontroller having associated output stages which are used to control components. In the case of over-voltage, the output stage is disconnected. Two technology-related, voltage monitoring devices working in different operating voltage ranges are provided. Due to the combination thereof, a highly precise disconnection threshold and a greater area for the operating voltage, which is to be monitored, can be obtained. If a malfunction of an over-voltage occurs, the output stages can be disconnected in a reliable manner.

13 Claims, 3 Drawing Sheets

U.S. PATENT DOCUMENTS

| | | | |
|---|---|---|---|
| 6,574,545 B2 * | 6/2003 | Hartke et al. | 701/107 |
| 7,117,829 B2 * | 10/2006 | Haas | 123/90.15 |
| 2002/0013654 A1 * | 1/2002 | Masters et al. | 701/110 |

FOREIGN PATENT DOCUMENTS

| | | |
|---|---|---|
| DE | 196 04 736 C2 | 8/1997 |
| EP | 1 069 299 A1 | 1/2001 |
| JP | 57-183533 | 11/1982 |
| JP | 3078945 U | 8/1991 |
| JP | 7063114 A | 3/1995 |
| JP | 8159924 A | 6/1996 |

\* cited by examiner

ELECTRONIC CONTROL DEVICE AND METHOD FOR CONTROLLING THE OPERATION OF MOTOR VEHICLE COMPONENTS

BACKGROUND OF THE INVENTION

Field of the Invention

The present invention relates to an electronic control device and a method for controlling the operation of motor vehicle components, in particular an internal combustion engine or a transmission of a motor vehicle.

Such control devices and control methods are known per se and are implemented here by a physical electronic entity generally referred to as a "control unit" in which a multiplicity of control and/or monitoring functions for electronic or electrical components are combined.

As a result of the increasingly exacting requirements in respect of functionality placed on such control units in the past, the desired functions are nowadays implemented for the most part by using a microcontroller, the term "microcontroller" here designating e.g. an electronic program-controlled control device typically having—like a PC—a CPU, RAM, ROM and I/O ports, but—unlike a PC—being designed for a very specific application. Alternatively, a microcontroller can also be implemented by a hardwired or user configurable electronic component (e.g. ASIC, FPGA, etc.).

The components to be controlled by the control device may not only be components directly associated with an internal combustion engine, such as a fuel pump, a throttle valve, a fuel injector or a lambda probe, but also other vehicle components. On the input side, sensor signals or measured variables required for control purposes, e.g. relating to the crankshaft rotation speed and position, the engine temperature, the inlet air temperature and volume, the acceleration pedal position, etc. are fed to the control device. This enumeration of components to be controlled or of sensing components is in no way exhaustive and serves merely to illustrate the multiplicity of conceivable functions of a control device.

Because a microcontroller or rather its I/O ports are in most cases unsuitable for technology-related reasons for directly driving the vehicle components of interest here, these components are generally controlled by associated output stages which, on the input side, receive corresponding control signals from the microcontroller and, on the output side, provide the voltages or currents for activating or deactivating the components, such as the charging or discharging current of a piezo actuated fuel injection valve.

Particularly with regard to the safety critical functions, in addition to the control signals, a digital so-called enabling signal by means of which disabling or enabling of activation is signaled depending on the enabling signal state is also normally fed to the output stages, this enabling which is independent of the actual driving of the output stage being provided by an enabling control device.

In known control devices, such an enabling control device is part of a so-called monitoring unit which monitors the proper operation of the microcontroller in order to take appropriate action in the event of a fault, e.g. resetting the microcontroller and/or, by means of the enabling control device, setting one or more of the abovementioned enabling signals to the signal state with which each associated output stage is disabled, i.e. shut down.

Such a monitoring unit, often known as a "watchdog", can be incorporated in the microcontroller or disposed separately from same. The basic operation of a monitoring unit of this kind is, for example, that from time to time it sets the microcontroller tasks and determines on the basis of the results returned by the microcontroller whether or not the microcontroller is operating correctly.

When such a monitoring unit exceeds a certain complexity, in practice it makes economic sense to implement this unit (as well as the microcontroller) in a different technology from the output stages, which are in most cases power output stages, i.e. advantageously in a low-volt technology.

For reasons of increased safety, the electrical connections provided for transmitting enabling signals to the relevant output stages (shutdown paths) can be of redundant design. In addition, the ability to shut down output stages by means of the digital enabling signals can be checked using a self test in the inactive system state.

However, if during operation of the control device a fault occurs which must be detected by the monitoring unit, and output stages must be placed in a state defined as "safe" by means of the digital enabling signal, with known control devices shortcomings appear in practice in the case of overvoltages.

Any behavior of the electronic components used in the control device can only be guaranteed within a limited, technology-related operating range. As soon as this range is left, e.g. if impermissibly high voltages (e.g. supply and/or signal voltages) are present anywhere in the system, any configuration of the enabling signals is conceivable. In the target environment the terminal pins of a control unit are subjected to voltages which are generally outside the operating voltage range specified for the logic circuits of the microcontroller and possibly of the monitoring unit and can therefore in principle result in the malfunctioning or even the destruction of these circuits.

If said monitoring unit is also responsible for overvoltage detection, the case may arise that the monitored voltage itself exceeds the permissible operating voltage range of the monitoring unit, so that it can no longer be guaranteed that the output stages are placed in the desired predetermined fault event state.

For example, it may happen that, in the event of an overvoltage, an enabling signal is not converted into the disable state causing the associated output stage to be shut down, because the overvoltage impairs the proper operation of the monitoring unit or more precisely its enabling control device itself.

In addition, exceeding the permissible voltages on the control unit's circuits which are implemented in low-volt technology (e.g. 5V and/or 3.3V) may result in an undefined number of sequential faults because of the high sensitivity of these circuits.

To resolve this problem of the often inadequate reliability in the event of an overvoltage, it is conceivable to make the microcontroller and/or the monitoring unit more robust. However, such solutions would be very expensive.

SUMMARY OF THE INVENTION

An object of the present invention is therefore to provide a control device and a method for controlling the operation of motor vehicle components, in particular an internal combustion engine or a transmission of a motor vehicle, using a microcontroller with an improved performance in the event of an overvoltage.

This object is achieved with an electronic control device according to claim 1 and a control method according to claim 7. The dependent claims relate to advantageous developments of the invention.

According to the invention, "split overvoltage monitoring" is employed, namely using a first voltage monitoring device operating in a first operating voltage range and a second voltage monitoring device operating in a second operating voltage range. This configuration allows one or more output stages to be reliably placed in the fault event state even in the specific fault scenario of an overvoltage.

The control device's operating voltage(s) to be monitored can be any voltages which are normally within the first permissible operating voltage range.

Preferably at least one supply voltage of a monitoring unit of the abovementioned kind is monitored. However, it is not ruled out to alternatively or additionally monitor a supply voltage of a control device component different from the monitoring unit, in particular a microcontroller chip or a chip manufactured in a comparable microelectronic technology in respect of the operating voltages.

The first voltage monitoring device can be implemented e.g. in a low-volt technology (e.g. 3.3V and/or 5V). In practice this has the advantage that the exceeding of a predetermined first limit voltage can be particularly precisely determined because the circuit sections implemented in such a technology are generally subject to only slight disturbances.

In a preferred embodiment, the first voltage monitoring device is incorporated in a monitoring unit of the abovementioned type, i.e. in particular implemented together with the normal circuit sections of the monitoring unit in a common integrated circuit which can also include the microcontroller.

If the monitored operating voltage exceeds the first limit voltage by a certain amount, specifically exceeds the operating voltage range specified for the first voltage monitoring device, this is reliably detected by the second voltage monitoring device with suitably selected second limit voltage. Preferably the second limit voltage is selected slightly larger than the first limit voltage, e.g. less than 10% larger.

For a microcontroller or a monitoring unit with external 5V logic levels, a safe operating voltage range up to 7V can be provided, for example, by virtue of the technology. The first voltage monitoring device can then provide e.g. a voltage of 5.3V as a precisely defined first limit voltage. The second limit voltage must then be selected in the range between 5.3 and 7V, e.g. at 5.6V, the second voltage monitoring device being able to possess e.g. a permissible operating voltage range up to 36V.

Using the combination of the two voltage monitoring devices, a high degree of precision (in respect of the first limit voltage) can be combined with a large voltage monitoring range (which is covered by the technology of the second voltage monitoring device).

Preferably the microcontroller and/or the monitoring unit on the one hand and the output stage on the other can be implemented as separate integrated circuits, and it is further preferable for the second voltage monitoring device to be implemented in such a way that its operating voltage range includes the maximum expected operating voltage range of the output stage in the relevant application.

The predetermined fault event state of the output stage can be e.g. that the output stage is completely shut down.

If one of the two voltage monitoring devices has detected an overvoltage, an enabling signal in the disable state, for example, can be fed out to the relevant output stage or stages in order to disable activation of the controlled components (at least as long as the overvoltage is present and/or at least for a predefined period of time).

It is alternatively or additionally possible to selectively influence the state of the output stage in another way, if the relevant output stage allows this, e.g. by transmitting some kind of fault event signal (independently of the enabling signal), such as a reset signal.

Preferably an enabling control device of the abovementioned type is incorporated microelectronically in the monitoring unit (watchdog), e.g. in an ASIC in a low-volt mixed technology for analog and digital circuit blocks. Said watchdog monitors the proper operation of the microcontroller and only provides the enabling signal in the state in which the associated output stage(s) can be operated if proper microcontroller operation is detected. This monitoring unit can then advantageously also assume the function of the first voltage monitoring device, a precise voltage reference being providable for this purpose (with a precision that could not generally be achieved e.g. in the output stages to be shut down). In order to place the output stages in the predetermined fault event state if an overvoltage occurs, the shutdown paths present anyway in the region of the monitoring unit can be advantageously used, e.g. by outputting a signal disabling the output stages. The shutdown threshold (first limit voltage) can be selected in the range between the maximum voltage obtaining operationally and the maximum voltage permissible for technology-related reasons at the monitoring unit ("abs. max. rating").

In many application scenarios, e.g. if a commercially available microcontroller chip is to be used, it is advantageous to provide the monitoring unit including the enabling control device in a common integrated circuit disposed separately from the microcontroller chip.

If the output stage possesses a higher dielectric strength than the microcontroller or rather the circuit sections of the control device which are required for providing the enabling signal, the overvoltage-induced failure in the region of the microcontroller and/or of the monitoring unit and/or of the enabling control device can nevertheless be reliably detected, as long as the overvoltage does not cause the output stage to fail. However, the latter is easy to ensure by suitably dimensioning the dielectric strength of the output stage (e.g. 36V) which in practice must often be designed anyway for the vehicle's electrical supply voltage (e.g. 12V or 24V) plus a certain safety margin.

When an overvoltage is detected, this can also be signaled to logic circuit sections of the control device, in particular to the microcontroller and/or a voltage supply unit with reset functions which, at startup of the control device, first resets or starts the individual device components in a defined manner.

BRIEF DESCRIPTION OF THE DRAWINGS

The invention will now be described in greater detail on the basis of examples with reference to the accompanying drawings in which.

DESCRIPTION OF THE PREFERRED EMBODIMENTS

Figure 1:
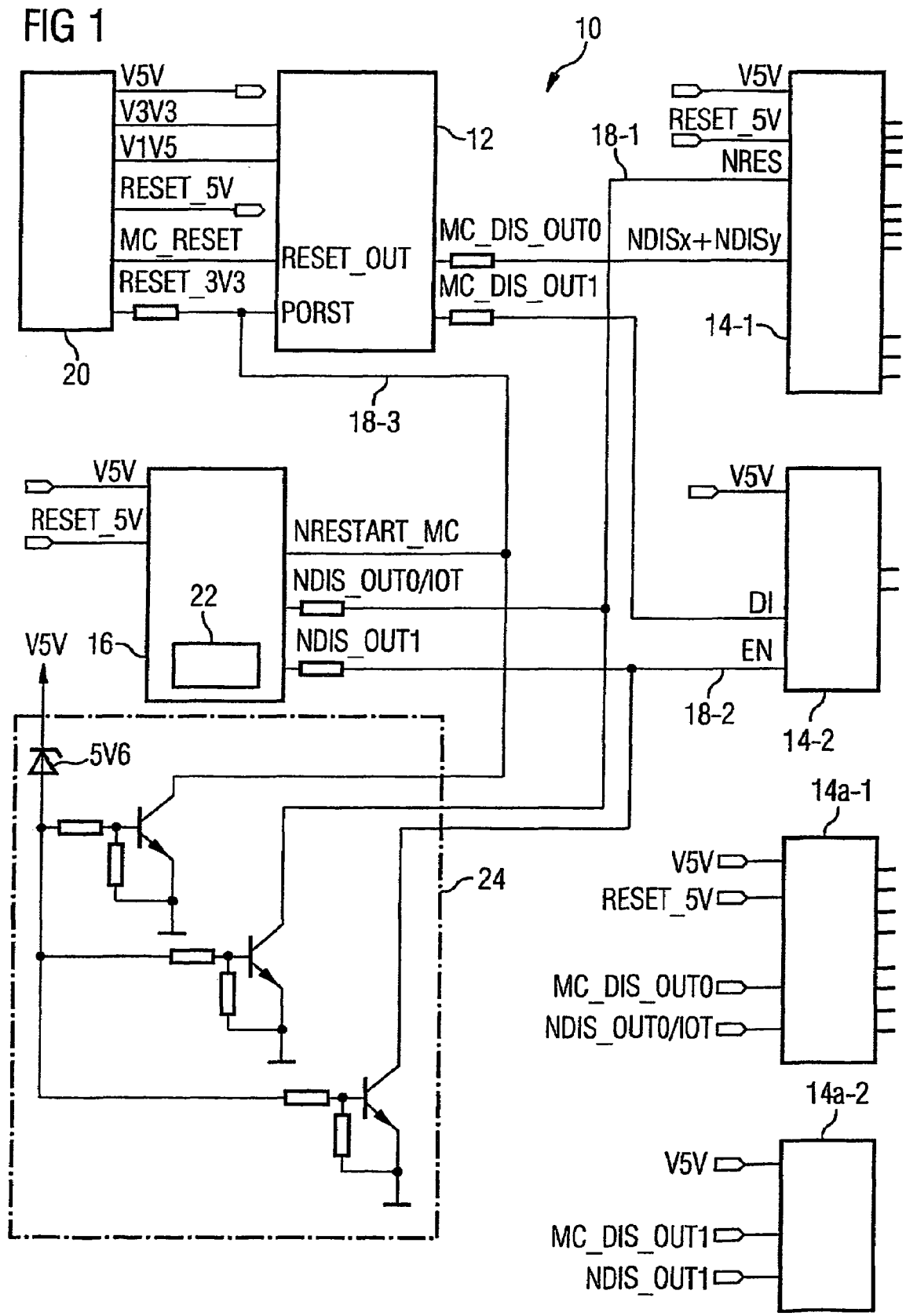
FIG. 1 shows a schematic block diagram of an engine control unit for controlling the operation of an injection-type engine of a motor vehicle.

The reference numerals of components which are multiply provided but analogous in their effect are consecutively numbered (supplemented in each case by a dash and a serial number). Reference will also be made below to individual components of this kind or to the totality of such components by the unsupplemented reference numeral.

FIG. 1 shows essential components of an engine control unit, denoted as a whole by 10, for a gasoline direct injection engine of a motor vehicle.

The engine control unit 10 has a microcontroller 12 in order to provide control signals (not shown) for controlling vehicle components to be controlled during the operation of an internal combustion engine, in this example engine components.

FIG. 1 additionally shows, by way of example, output stages 14-1 and 14-2 to which said control signals for activating or deactivating the components to be controlled are fed in order to apply suitable drive voltages or currents to the connected components (here e.g. fuel injection system and throttle valve).

In per se known manner there is additionally provided a monitoring unit 16 which communicates with the microcontroller 12 via a communication link (not shown) in order in particular to monitor the microcontroller's proper operation and, as a function of this monitoring, to set e.g. digital enabling signals accordingly for the output stages 14-1 and 14-2 illustrated. By means of these enabling signals there is signaled by a first logical signal state "Low" (L) a disabling and by a second logical signal state "High" (H) an enabling of activation of the fuel injection system (via the output stage 14-1) or of the throttle valve (via the output stage 14-2).

The output stages 14 for activating and deactivating the components to be controlled, here the fuel injection system and the throttle valve, therefore operate on the basis of the relevant control signal, taking into account an enabling signal applied to the relevant output stage 14. These enabling signals are fed to the output stages 14-1, 14-2 in per se known manner via line connections ("shutdown paths") 18-1, 18-2. Another shutdown path 18-3 leads to a reset line running between the microcontroller 12 and a voltage supply unit 20.

When the internal combustion engine is started up, the voltage supply unit 20 supplied from the vehicle electrical system provides supply voltages of 5V for the output stages 14-1, 14-2 and the monitoring unit 16 as well as supply voltages of 3.3V and 1.5V for the microcontroller 12. After stabilization of these supply voltages, the voltage supply unit 20 delivers a reset signal to the microcontroller 12 (input pin PORST) in order to reset its 3.3V circuits. After this initialization of the microcontroller 12, the latter in turn sends a reset signal indicating its readiness (output pin RESET_OUT) back to the voltage supply unit 20 which then delivers a reset signal to the control unit components 14-1, 14-2, 16 supplied with 5V in order to reset them. All the described control unit components then operate to control the operation of the internal combustion engine.

In this active operation of the control unit 10, the monitoring unit 16 monitors the proper operation of the microcontroller 12 and possibly other control unit components connected to the microcontroller 12.

The output stage 14-1 only initiates fuel injection by outputting corresponding drive signals to the various fuel injectors (the signal line outputs shown at the right-hand edge of FIG. 1 symbolize the driving of fuel injectors) if the enabling signal entered via the shutdown path 18-1 of the output stage 14-1 is in the enable state, the injection timing and the injection quantities being essentially determined by the control signal(s) fed out by the microcontroller 12. For simplicity's sake, control signal monitoring is not shown here.

In addition, in the diagram in FIG. 1 all the circuit sections of the control unit 10 which are not essential for understanding the invention and can be configured in conventional manner (e.g. input signals at the microcontroller for recording various sensor signals required in the context of vehicle component control or engine control) have been omitted.

In analogous manner, driving of the throttle valve is enabled or disabled by means of the enabling signal fed to the output stage 14-2 via the shutdown path 18-2.

A special feature of the control unit 10 illustrated consists in the arrangement of two independently operating voltage monitoring devices 22, 24 for monitoring the 5V operating voltage which is used for supplying some control unit components such as the output stages 14-1, 14-2 and the monitoring unit 16 itself, the first voltage monitoring device being microelectronically integrated in the monitoring unit 16 (ASIC chip) and detecting the case whereby this operating voltage exceeds a predetermined first limit voltage of 5.5V. Also in the event of such an overvoltage, the monitoring unit 16 causes disable signals to be fed out via the shutdown paths 18, thereby initiating shutdown of the output stages 14-1 and 14-2 and resetting of the 3.3V circuits of the microcontroller 12.

In the example shown, the same shutdown or rather resetting functions are also provided for the event that the monitored operating voltage falls below a defined limit value (here e.g. 4.5V).

The shutdown of the output stages 14 which is provided in the present example constitutes a fault event state into which the output stages must be placed in the event of an overvoltage. In the example shown, this is done by outputting disable signals via the corresponding shutdown paths 18.

The monitoring unit 16 and in particular its voltage monitoring device 22 is implemented in a microelectronic circuit technology possessing a permissible operating voltage range up to 7V. If, in the event of a fault, a voltage present on the chip containing the monitoring unit 16, in particular the operating voltage to be monitored, exceeds the maximum permissible voltage of 7V, the operation of this monitoring unit 16 (as well as other control unit components which are supplied with this operating voltage) is no longer guaranteed. Depending on the specific magnitude and duration of the overvoltage, this may even result in the destruction of these for technology-related reasons highly sensitive control unit components.

In order to place the output stages 14-1, 14-2 in the predetermined fault event state even in this case, the 5V operating voltage is also monitored by the second voltage monitoring device 24, this device operating for technology-related reasons in an operating voltage range extending beyond the first permissible operating voltage range of up to 7V, e.g. up to a maximum voltage of 36V for which the output stages 14-1, 14-2 are also designed. If the 5V operating voltage additionally monitored by the second voltage monitoring device 24 exceeds a value overridingly determined by a zener voltage of 5.6V, the shutdown paths 18-1, 18-2, 18-3 are set to the disable state by the voltage monitoring device 24 in order to shut down the output stages 14-1, 14-2 connected thereto or rather to initiate the resetting of the microcontroller 12 explained above.

The voltage monitoring therefore possesses a very precise first limit voltage predefinable by the first voltage monitoring device 22 and, because of the comparatively high dielectric strength of the second voltage monitoring device 24, a large operating range which in the example shown is designed for the maximum expected voltages in the environment of the engine control unit 10.

FIG. 1 shows an exemplary configuration of the second voltage monitoring device 24. If the 5V operating voltage fed to the device exceeds the zener diode breakdown voltage of 5.6V by a certain amount, currents flow via resistors each arranged in parallel with the base-emitter junction of turn-off transistors so that the voltage dropped across these resistors renders these transistors conducting and connects the transistors [lacuna] the shutdown paths 18 to the electrical vehicle ground. This corresponds to the desired disable signal on the shutdown paths 18-1, 18-2 or the reset signal on the line 18-3.

The second voltage monitoring device 24 is preferably implemented as an integrated circuit.

Alternatively or additionally, voltages other than the 5V supply can of course be monitored.

At variance with the example shown it is conceivable to distribute the functionality of this second voltage monitoring device 24 wholly or partly over the output stages 14. For example, in the example shown the turn-off transistors (and associated zener diode in each case) provided for shutting down the output stages 14-1 and 14-2 can be incorporated in a chip forming the output stage 14-1 or 14-2 as the case may be. It is essential that the second voltage monitoring device operates for technology-related reasons in a comparatively wide permissible operating voltage range.

Self-evidently the engine control unit 10 can in practice have further output stages for controlling further vehicle components for which the above described method of particularly reliable shutdown signal generation can likewise be used in the event of an overvoltage.

In the example shown, for technology-related reasons each of the output stages 14-1, 14-2 has a relatively high dielectric strength, compared to the microcontroller 12 and/or the first voltage monitoring device 22, of 36V. Advantageously therefore the output stages can still be reliably disabled or rather shut down if circuit sections of the control unit 10 which are involved in providing the enabling signals are impaired or destroyed by an overvoltage.

The failsafe performance of the overall system is therefore improved because of the two-part overvoltage monitoring as regards an overvoltage-induced failure of logic devices such as the monitoring unit 16 or the microcontroller 12. The for technology-related reasons more robustly implemented second voltage monitoring device can reliably bring about shutdown of the output stages 14-1, 14-2 even when the first voltage monitoring device 22 has failed.

The control unit 10 therefore cost-effectively provides precise overvoltage monitoring that nevertheless covers a large voltage range and which considerably improves the failsafe performance of the overall electrical system, which is of great importance for safety reasons particularly in a motor vehicle.

In the following description of further examples, the same reference numerals will be used for functionally analogous components, but with a lower-case letter added to differentiate between the embodiments, details essentially only being given of the differences compared to the example(s) already described and otherwise reference being expressly made thereby to the description of previous examples.

As an alternative to the output stages 14-1, 14-2, FIG. 1 shows the output stages 14a-1, 14a-2 to be used for implementing the control unit for a diesel engine, the output stage 14a-1 again serving to drive individual fuel injectors, whereas the output stage 14a-2 is used to drive a fuel pump device and/or for regulating the fuel pressure in a common rail for the diesel injectors.

Figure 2:
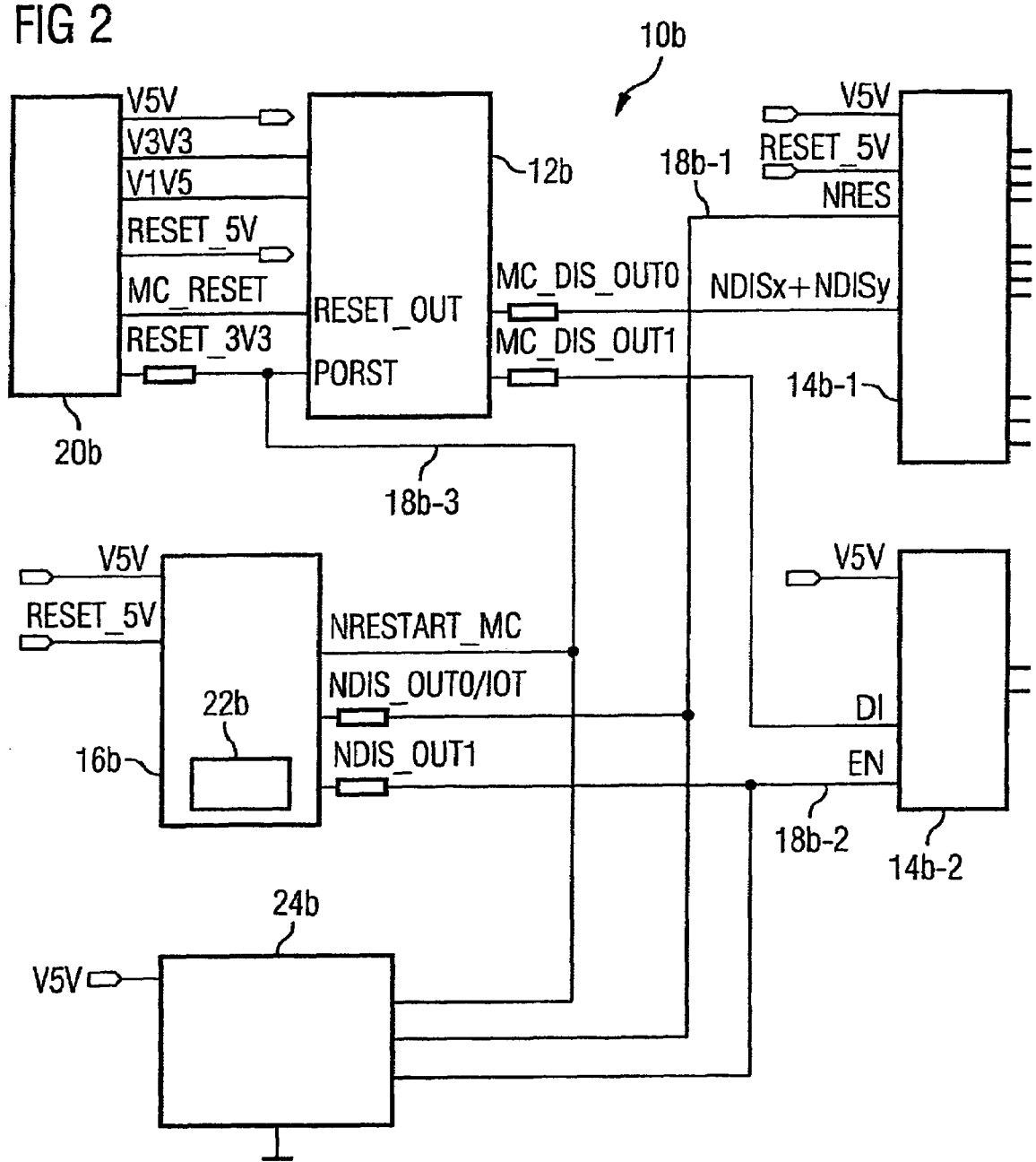
FIG. 2 shows a schematic block diagram of an engine control unit according to another embodiment.

FIG. 2 shows another embodiment of an engine control unit 10b wherein the second voltage monitoring device 24b is implemented as a separate chip which is advantageously combined with chips already commercially available in the control unit 10b which form one of the other control unit components in each case, such as the components 20b, 12b, 14b-1, 14b-2 and 16b illustrated.

Figure 3:
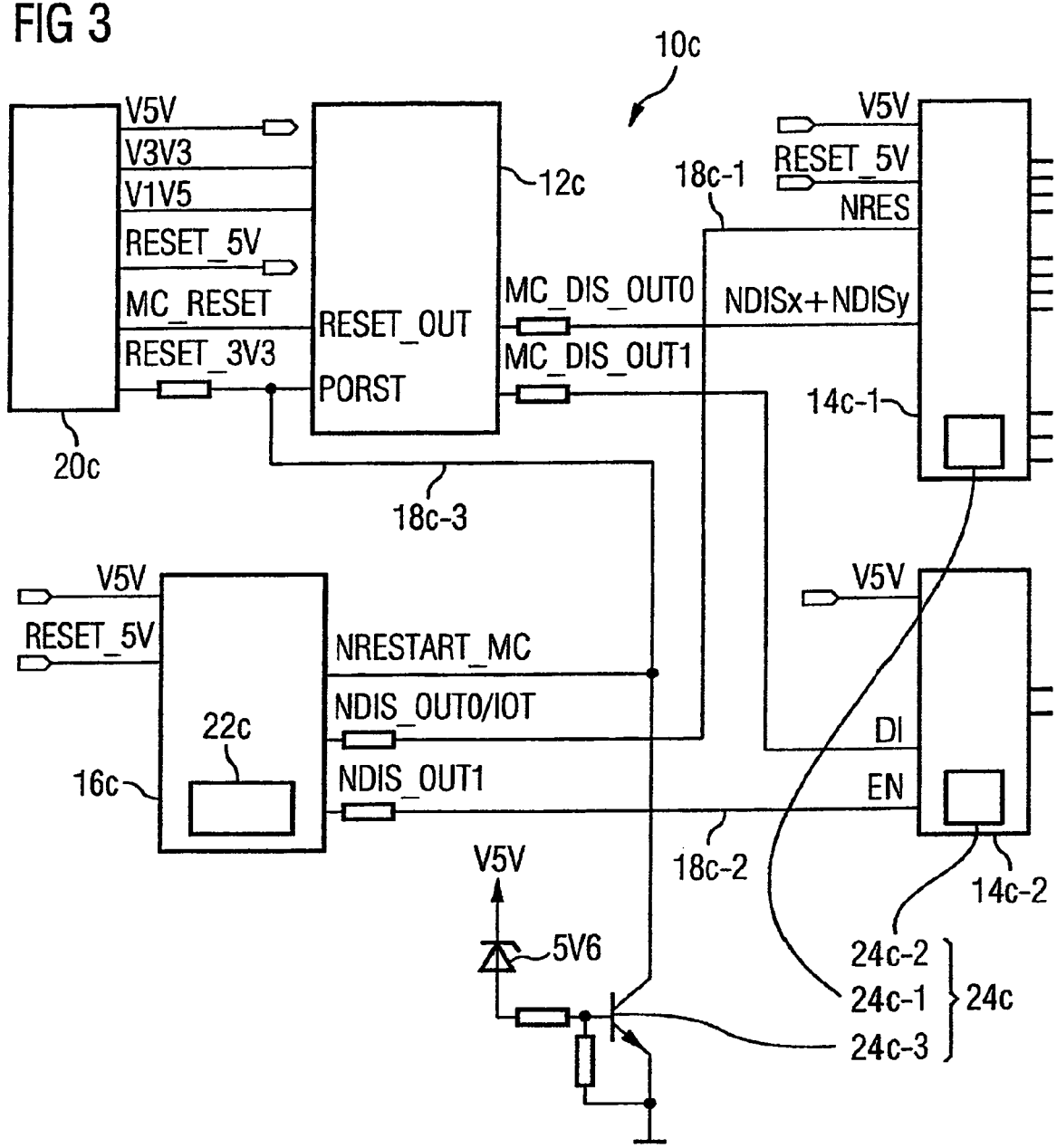
FIG. 3 shows a schematic block diagram of an engine control unit according to yet another embodiment.

FIG. 3 shows a further embodiment of a control unit 10c wherein, in the above explained manner, the second voltage monitoring device 24c comprises three sections 24c-1, 24c-2 and 24c-3 and these sections are disposed in the output stage 14c-1, 14c-2 or as a separate circuit 24c-3.

We claim:

1. An electronic control device for controlling an operation of motor vehicle components, comprising:
   a microcontroller for providing at least one control signal for controlling at least one component to be controlled during an operation of a motor vehicle, said microcontroller operating within a first permissible predefined operating voltage range;
   at least one output stage connected to receive the control signal and configured to selectively activate and deactivate the component to be controlled based on the control signal;
   a first voltage monitoring device operating in the first permissible operating voltage range, said first voltage monitoring device monitoring at least one particular operating voltage of the control device and disabling or resetting said output stage if the at least one monitored operating voltage exceeds a predetermined first limit voltage, the first limit voltage being selected within the first permissible operating voltage range; and
   a second voltage monitoring device operating in a second permissible operating voltage range extending beyond the first permissible operating voltage range, said second voltage monitoring device monitoring the at least one operating voltage and disabling or resetting said output stage if the at least one monitored operating voltage exceeds a predetermined second limit voltage, the second limit voltage lying within the first permissible operating voltage range and being greater than the first limit voltage.

2. The control device according to claim 1 implemented as a control device for controlling components of an internal combustion engine.

3. The control device according to claim 1 implemented as a control device for controlling components of a transmission of a motor vehicle.

4. The control device according to claim 1, wherein said microcontroller is implemented in an integrated circuit; and said first monitoring device and said output stage are not implemented in said integrated circuit.

5. The control device according to claim 1, wherein said first voltage monitoring device is incorporated in a monitoring device configured to monitor a proper operation of said microcontroller and wherein said monitoring device, upon detecting improper operation, disables said output stage.

6. The control device according to claim 5, which comprises an enabling signal line running between said monitoring device and said output stage, said enabling signal line carrying a digital enabling signal to said output stage for signaling enabling and disabling the operation of said output stage, and wherein said output stage is disabled by a predetermined signal state of the enabling signal.

7. The control device according to claim 6, wherein said second voltage monitoring device is connected to said enabling signal line and said second voltage monitoring device, in the event of the second limit voltage being exceeded, disables said output stage by defining a particular signal state of the enabling signal.

8. The control device according to claim 1, wherein the second permissible operating voltage range includes a maximum expected voltage in said output stage.

9. The control device according to claim 1, in combination with the component to be controlled, wherein:
- said output stage cannot activate the component to be controlled when said output stage is disabled; and
- the component to be controlled is a throttle valve or a fuel injector.

10. A method of controlling an operation of motor vehicle components, the control device including:
- a microcontroller for outputting at least one control signal for controlling at least one component to be controlled during an operation of a motor vehicle, the microcontroller operating in a first permissible operating voltage range; and
- at least one output stage connected to the microcontroller for selectively activating and deactivating the component to be controlled based on the control signal;

the method which comprises:
- monitoring at least one particular operating voltage of the control device with a first voltage monitoring device operating in the first permissible operating voltage range and disabling or resetting the output stage if the at least one monitored operating voltage exceeds a predetermined first limit voltage selected within the first permissible operating voltage range; and
- monitoring the at least one operating voltage with a second voltage monitoring device operating in a second permissible operating voltage range extending beyond the first permissible operating voltage range and disabling or resetting the output stage if the at least one monitored operating voltage exceeds a predetermined second limit voltage selected within the first permissible operating voltage range and greater than the first limit voltage.

11. The method according to claim 10, which comprises controlling components of an internal combustion engine.

12. The method according to claim 10, which comprises controlling a transmission of a motor vehicle.

13. The method according to claim 10, which comprises:
- if the at least one monitored operating voltage exceeds the predetermined first limit voltage and/or the predetermined second limit voltage, disabling the output stage to prevent the output stage from activating the component to be controlled; and
- providing the component to be controlled as a throttle valve or as a fuel injector.

* * * * *